United States Patent [19]

Griffaton

[11] Patent Number: 5,302,800
[45] Date of Patent: Apr. 12, 1994

[54] PROCESS AND DEVICE FOR CONTROLLING THE OPERATION OF AN OPTICAL CHANNEL FOR A LASER-BEAM CARRIED BY A WELDING TOOL

[75] Inventor: Jacques Griffaton, Chalon-sur-Saone, France

[73] Assignee: Framatome, Courbevoie, France

[21] Appl. No.: 898,722

[22] Filed: Jun. 15, 1992

[30] Foreign Application Priority Data

Jun. 13, 1991 [FR] France .................. 91 07240

[51] Int. Cl.$^5$ ............................................. B23K 26/00
[52] U.S. Cl. ........................... 219/121.63; 219/121.64; 219/121.83
[58] Field of Search ............ 219/121.63, 121.64; 376/260

[56] References Cited

U.S. PATENT DOCUMENTS 4,694,136 9/1987 Kasner et al. ............... 219/121.64
5,004,890 4/1991 Lim ............................. 219/121.83
5,089,684 2/1992 Griffaton ..................... 219/121.63

FOREIGN PATENT DOCUMENTS 0075912 4/1983 European Pat. Off. .
0119883 9/1984 European Pat. Off. .
0406043 1/1991 European Pat. Off. .
2649923 1/1991 France .

Primary Examiner—C. L. Albritton
Attorney, Agent, or Firm—Pollock, Vande Sande & Priddy

[57] ABSTRACT

The control of the optical operation of a laser beam welding tool is carried out, when the tool is in an out of service position, by low-power auxiliary radiation. This radiation is passed to a measuring device (64) equipped with a photoelectric cell (86) after having traversed the tool as far as a welding head (58). The control can apply to an optical channel carried by a welding iron used for welding repair sleeves in pressurized water nuclear reactor steam generator tubes.

9 Claims, 3 Drawing Sheets

PROCESS AND DEVICE FOR CONTROLLING THE OPERATION OF AN OPTICAL CHANNEL FOR A LASER-BEAM CARRIED BY A WELDING TOOL

FIELD OF THE INVENTION

The present invention relates to a process and a device for controlling the operation of an optical channel carried by a welding tool.

BACKGROUND OF THE INVENTION

The prior art already includes a process for controlling the operation of an optical channel carried by a welding tool and conducting a welding laser beam, at operational power, from a laser source to a welding location.

It is known to utilize a welding tool such as a laser beam welding iron for welding operations in confined spaces, especially in the tubes of a nuclear reactor steam generator cooled by pressurized water. These steam generators comprise a bundle consisting of a large number of tubes of small diameter (approximately 20 mm), bent into a U shape and fixed at each of their ends by crimping in a tubular plate of large thickness. That part of the steam generator which is situated below the tubular plate delimits a water reservoir into which the ends of the tubes of the bundle open. The stresses to which the tubes are subjected give rise, in some cases, to fissures in the walls of these tubes. It is known to carry out the repair of these tubes by sleeve coupling of the tubes. For this purpose, repair sleeves are fixed in the tubes by welding, by means of a laser beam welding iron which is inserted into the water reservoir and into the tubes.

Applicant's FR-A-89/08,635 shows a welding set, comprising a laser beam welding iron which is utilized to carry out the sleeve coupling of tubes of a steam generator and which is disposed within the water reservoir of the generator.

The welding iron comprises an optical channel which essentially comprises an optical fiber conducting the laser beam along the iron from a laser source, disposed outside the water reservoir, to a welding head of the iron, and optical means, disposed in this head, which are adapted to focus the laser beam on a welding location.

In order to carry out the welding operations under good conditions, the optical operation of the welding iron is controlled and the good transmission of the power of the laser beam in the optical channel of the iron is ensured. To this end, the power emitted at the exit of the laser source is generally measured before entry of the beam into the optical fiber. The measurement of the power at the exit of the optical fiber or at the exit of the welding head requires a space adequate to arrange means for sampling the beam and means for measuring the power of the beam. In the case of a welding operation within the tubes of a steam generator, there is not adequate space to insert such means. Moreover the extraction of the welding iron out of the water reservoir, for example with a view to carrying out a measurement of the power of the beam, is detrimental to the work sequence and the equipment.

SUMMARY OF THE INVENTION

The object of the invention is to detect the faults in or the degradation of the optical channel carried by a welding tool, especially a welding iron used in confined spaces, in order to ensure the good transmission of the power of the welding laser beam, this taking place with measuring means having a low space requirement.

To this end, the subject of the invention a control process of the aforementioned type, in which, between two welding operations:

the welding tool is displaced from an operational position in the region of the welding location to an out of service position; the optical channel of the welding tool is supplied with auxiliary optical radiation having a power lower than the operational power of the laser beam;

the luminous intensity emitted by the welding tool is measured, in its out of service position, supplied with the auxiliary optical radiation;

this intensity is compared with an intensity threshold corresponding to the satisfactory operation of the welding tool; and the welding tool is displaced towards a new operational welding position.

According to other features of the invention:

the auxiliary optical radiation is emitted by a helium-neon laser utilized to make the invisible laser beam visible when the latter is operational;

the auxiliary optical radiation is emitted by the welding laser, which is adjusted to a power lower than the operational power;

the auxiliary optical radiation is emitted by a light-emitting diode at a wavelength adapted to its transmission in the optical channel of the welding tool;

the radiation emitted by the light-emitting diode has a wavelength equal to the wavelength of the welding laser;

the laser and the light-emitting diode emit at an identical wavelength of 1.06 microns.

The subject of the invention is also the aforementioned process applied to the control of an optical channel carried by a welding iron utilized for the sleeve coupling of a bundle of tubes of a steam generator of a pressurized water nuclear reactor, the welding iron having a welding head which is inserted into the tubes, via their ends opening into a water reservoir of the generator, so as to reach its operational position, and which is extracted from the tubes to be displaced in the water reservoir, a period Measurement is carried out of the luminous intensity emitted by the iron supplied with the auxiliary optical radiation during the displacement, in the water reservoir, of the welding head between a position of the head aligned with a first tube which has just been sleeve-coupled and a position of the head aligned with a second tube which is to be sleeve-coupled.

Another subject of the invention is a control device for carrying out the aforementioned process. This device comprises a measuring means comprising a photo electric cell and an optical assembly which is disposed in relation to the welding tool in such a manner as to focus onto this cell the auxiliary radiation emitted by the welding tool in the out of service position.

This device is applied to the control of an optical channel carried by a welding iron used for the sleeve coupling of tubes of a steam generator of a pressurized water nuclear reactor, the welding iron being carried by a frame which is fixed on a carrier disposed within a water reservoir of the generator, and which comprises means for displacing the iron between its operational position and of service position. The means for measuring the luminous intensity is disposed on the frame in such a manner as to receive the auxiliary optical radiation emitted by the welding iron, in the out of service position of latter.

BRIEF DESCRIPTION OF THE DRAWINGS

An illustrative embodiment of the invention is described in greater detail hereinbelow with reference to the accompanying drawings, in which.

DESCRIPTION OF THE PREFERRED EMBODIMENT

Figure 1:
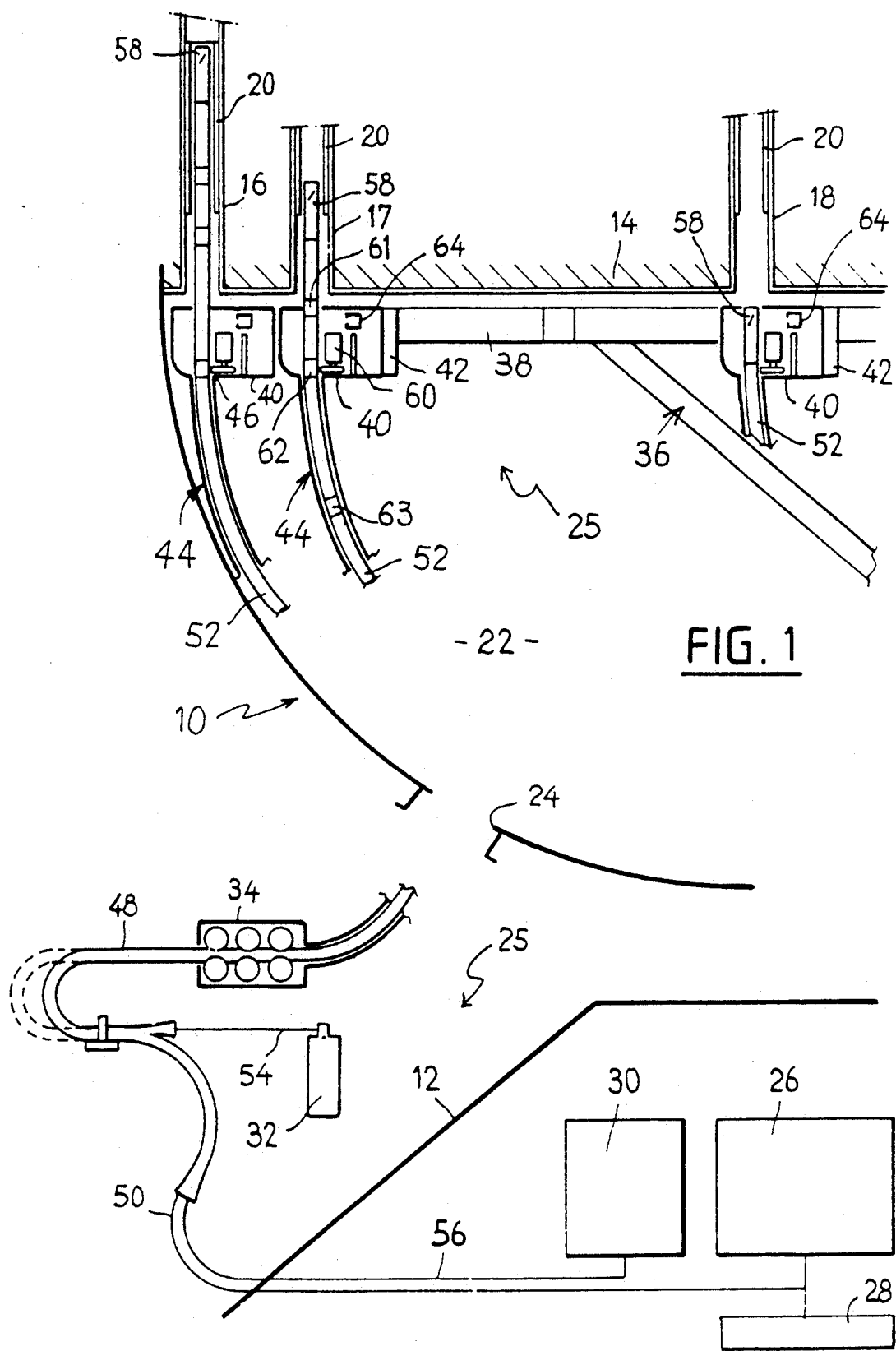
FIG. 1 is a schematic front view, in cross section, of the lower part of a steam generator of a nuclear reactor in which there is located a control device for carrying out the process according to the invention.

FIG. 1 shows a steam generator 10 disposed within a nuclear reactor building delimited by a wall 12 which separates the inside from the outside of the building.

The steam generator 10 comprises a tube plate 14 into which the ends of the tubes of a bundle which are bent into a U shape are fixed by crimping. The figure shows the ends of three tubes 16,17,18 only, in each one of which there has been disposed a repair sleeve 20. The ends of the tubes open into a water reservoir 22 equipped with a manhole 24.

FIG. 1 also shows a device 25 for the laser welding of the repair sleeves 20. This welding device comprises:

outside the nuclear reactor building, a laser source 26, an auxiliary radiation source 28 and an electrical power supply cabinet 30;

in the nuclear reactor building but outside water reservoir 22 of the steam generator, a source 32 of neutral or active gas and a pull-push device incorporating rollers 34;

in the water reservoir 22, a carrier 36 equipped with an arm 38 which carries a frame 40 at its end, via an elevator 42.

The laser welding device further comprises a flexible tube 44, referred to as a boa, which extends from a lower opening 46 of the frame 40 to the pull-push device 34, traversing the manhole 24 of the water reservoir. A sheath 48 passes within this boa and contains a sheathed optical fiber 50 connected to the laser source 26 and to the auxiliary radiation source 28. The sheath 48 constitutes the rear extension of a welding tool 52 referred to as a welding iron, in which the optical fiber 50 also passes. The boa 44 further contains a gas conduit 54, which is supplied by the gas source 32, and electrical cables 56 originating from the electrical cabinet 30.

The welding iron 52 conducts the laser beam from the laser source 26 to its distal end comprising a rotary welding head 58, which is shown in greater detail in FIG. 2 and which will be described hereinbelow.

The welding iron 52 traverses the frame 40. It is equipped with axial displacement means within the tubes 16,17,18, which are constituted in particular by the pull-push device 34, and with rotary displacement means which comprise a motor 60, disposed in the frame 40, and elements 61,62,63 for the rotary drive of the iron. These means are of known type and are described in greater detail in applicant's FR-A-89/08,635. The rotation of the welding iron 52 permits the formation of circular weld beads. The welding iron is disposed horizontally in the water reservoir, between two tubes to be sleeve-coupled, by means of the carrier 36.

FIG. 1 shows the welding iron 52 in two operational welding positions, at the left of the figure, and in a third, out of service position, on the right of the figure. The two operational welding positions correspond respectively to welding locations which are disposed at the top and at the bottom of the repair sleeve 20. The out of service position permits the horizontal displacement of the welding iron 52 between two tubes to be sleeve-coupled. In this out of service position of the welding iron, the welding head is opposite a luminous intensity measuring device 64 disposed within the frame 40.

Figure 2:
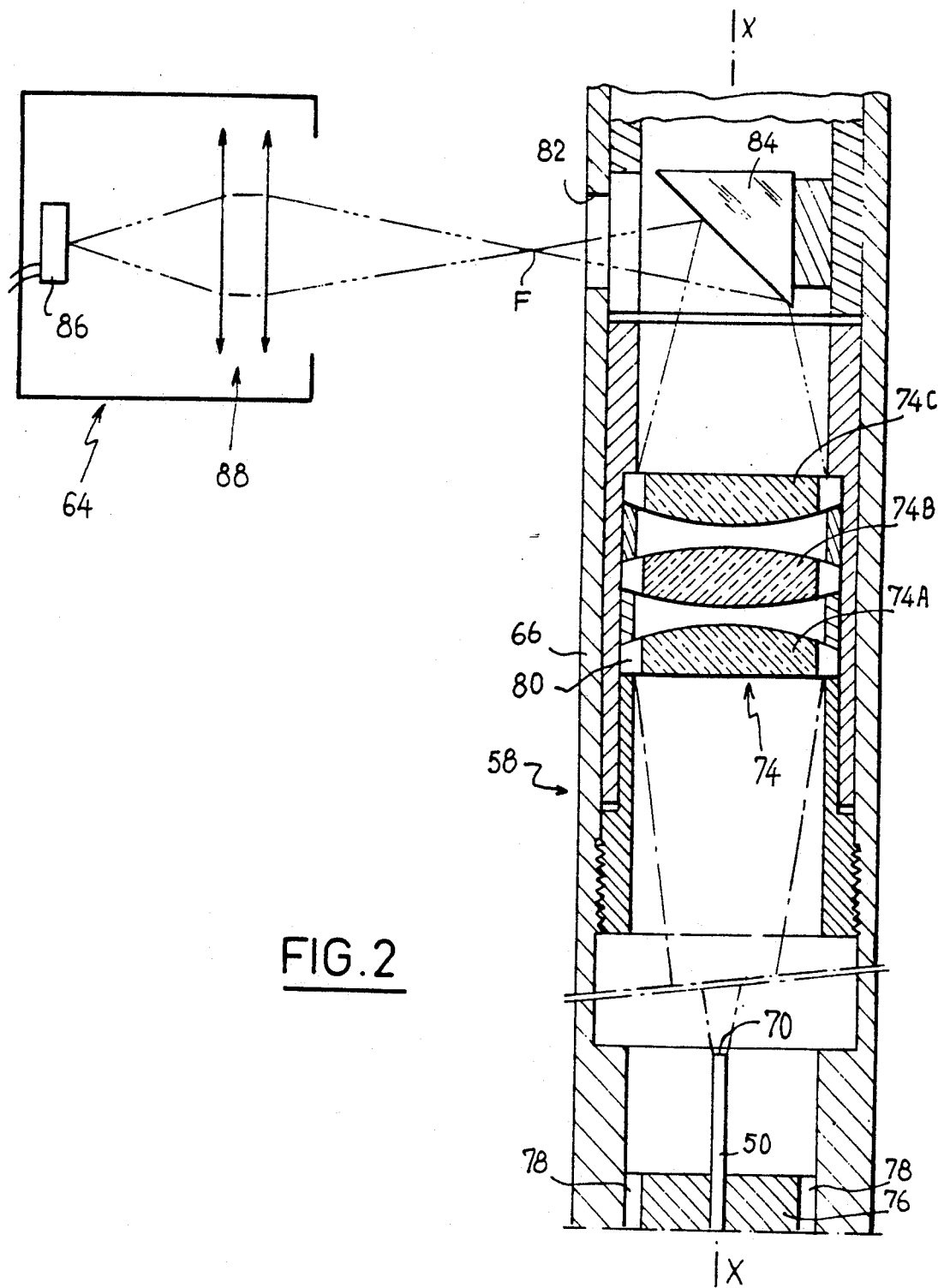
FIG. 2 is a schematic view, in longitudinal cross section, of a part of the welding head of the welding iron.

FIG. 2 shows, in greater detail, the welding head 58 of the welding iron positioned opposite the measuring device 64. The welding head 58 is delimited by a wall 66 of generally tubular shape within which the distal end 70 of the optical fiber 50 is disposed. This optical fiber emits a beam in the direction of a set of lenses 74, comprising two to three juxtaposed lenses 74A, 74B, 74C to collimate and focus the beam. The optical fiber 50 is carried by a sleeve 76 in such a manner as to be positioned according to the axis X—X of the welding head 58. The sleeve 76 comprises longitudinal peripheral grooves 78 forming passages for the neutral or active gas which is utilized for the welding operations and which originates from the gas source 32. For the same purpose, the lenses 74A,74B,74C comprise lateral notches 80, or, alternatively, may be supported by bushes and perforated struts (not shown).

The beam focused by the set of lenses 74 is deflected radially by a mirror 84, which is inclined at 45°, towards the outside of the welding head, through a lateral window 82 of the latter.

The optical fiber 50, the set of lenses 74 and the mirror 84 constitute an optical channel which, when the welding head is in an operational position, transmits the operational laser beam to a welding location which coincides with the focal point F of the beam, outside the welding head. When the welding iron is in the out of service position, as is shown in FIG. 2, the laser beam is no longer operational and a control of the optical operation of the iron is carried out. To this, and the welding iron is supplied with the radiation from the auxiliary source 28 which is transmitted to the measuring device 64 through the optical channel described hereinabove. The auxiliary radiation emitted radially by the welding head is detected by the measuring device 64 beyond the focal point F. This auxiliary radiation has a low power, as compared with the operational power of the laser beam, which power is adapted to the conditions of utilization of the measuring device 64.

Various auxiliary radiation sources may be used, for example a helium-neon laser which also makes the invisible laser beam visible, when the latter is operational. Another possible auxiliary radiation source is a light-emitting diode which emits radiation of a wavelength adapted to the transmission in the optical channel of the welding iron. In this case, it is possible to use a light-emitting diode emitting in a wavelength identical to that of the welding laser, for example equal to 1.06 microns, which is the wavelength of a YAG laser which is customarily used for welding. It is likewise possible to use as an auxiliary radiation source the welding laser adjusted to a power less than its operational power.

The measuring device 64 comprises a photo-electric cell 86 and an optical assembly 88 of two lenses which focuses on this cell the auxiliary radiation emitted by the welding iron. The photoelectric cell 86 converts the radiation received into an electrical signal. To detect a fault or the possible deterioration of the optical channel, the signal delivered by the photo-electric cell is compared with a predetermined threshold, which is a function of the condition of the elements constituting the optical channel.

The control of the optical channel of the welding iron is performed sequentially between two welding operations which are sequentially associated in the following manner:

the welding head is positioned opposite a welding location within a repair sleeve 20 of a tube and the welds required to fix the latter are carried out;

once the sleeve 20 has been fixed, the welding head is displaced vertically downwards, between its operational welding position and an out of service position such that the welding head is retracted into the frame 40, at the height of the measuring device 64, being axially aligned with the tube, the sleeve-coupling of which has been completed;

during the horizontal displacement of the welding iron towards another tube to be sleeve-coupled, the optical channel of the iron is supplied with the auxiliary optical radiation, the welding head 58 is turned in such a manner as to orient the radiation emitted through the window 82 of the head opposite the measuring device 64, the signal delivered by the photo electric cell 86 is measured, and this electrical signal is compared with the predetermined threshold corresponding to the satisfactory operation of the iron;

when the welding head is in line with another tube to be sleeve-coupled, the welding head is displaced vertically upwards, between its out of service position and an operational position such that the welding head is opposite a welding location within a repair sleeve 20.

The monitoring of the signal delivered by the photoelectric cell 86 of the measuring device permits the detection of a fault or a possible degradation of the optical channel of the welding iron. In this way the quality of the welding operations which have just been carried out is verified, and the correct operation of the iron for the next welding operations is ensured.

The sequential control of the optical channel of the welding iron is performed without extracting the welding iron from the water reservoir of the generator and during the displacement of the iron between two tubes to be sleeve-coupled.

As the auxiliary radiation source is of low power, the device for measuring the intensity of the radiation emitted by the welding iron, when it is out of service, has a low space requirement and this enables it to be housed in the frame, which is contained within the water reservoir.

Figure 3:
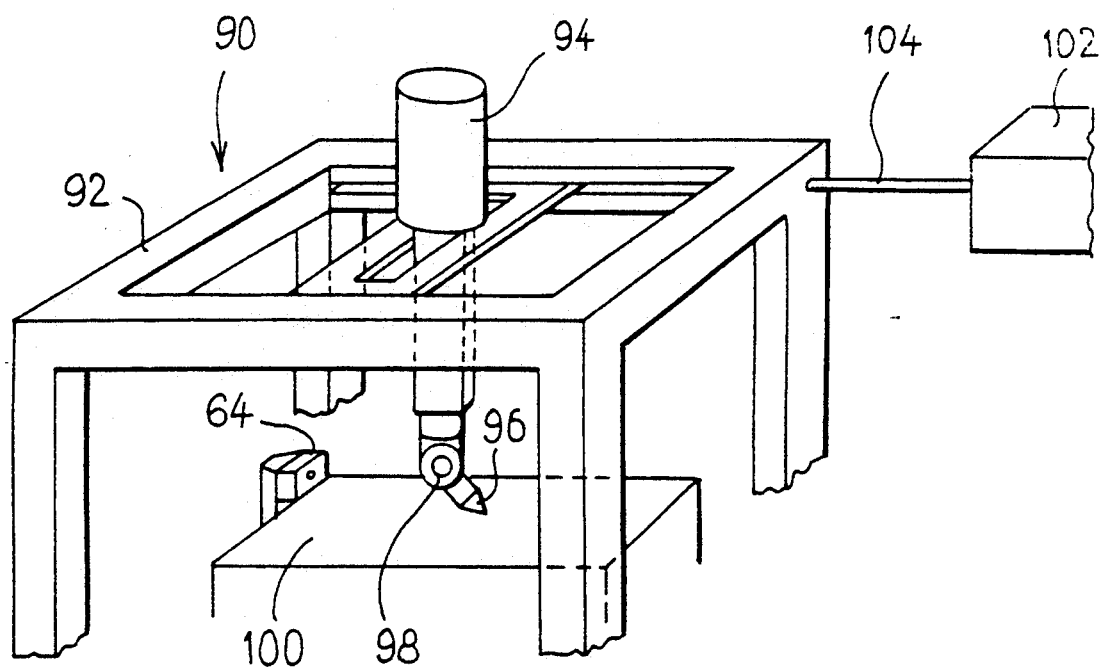
FIG. 3 is a schematic view, in perspective, of a welding tool.

It is seen in FIG. 3 how the control process according to the invention is applied to a laser beam welding tool other than the welding iron. This figure shows a welding tool 90 comprising a gantry 92 carrying a welding arm 94 which is equipped with a welding head 96 mounted so as to be articulated on a cuff 98. The welding tool 90 is utilized for the welding of objects arranged on a table 100. A casing 102 contains a laser source which emits a welding beam. The latter is conducted through the gantry 92 and the arm 94 to the welding head 96 by means of an optical channel, of known type, comprising an optical fiber 104 and/or mirrors (not shown).

It is likewise seen in FIG. 3 that, in order to carry out the control of the optical channel of the welding tool 90, the device for measuring the luminous intensity 64 has been disposed in the vicinity of the table 100. The auxiliary radiation source is housed, for example, within the casing 102. The welding tool 90 comprises known means for the displacement of its welding head 96 between an operational position and an out of service position, in which the head 96 emits the auxiliary radiation which is transmitted through the optical channel, towards the measuring device 64.

I claim:

1. Process for controlling the operation of an optical channel carried by a welding tool and conducting a welding laser beam, at an operational power, from a laser source (26) to a welding location, the welding tool being out of service, between two welding operations, the process comprising, between two welding operations, the steps of (a) providing at a controlling position luminous intensity measuring means having determinate working characteristics adapted to the measurement of the intensity of an auxiliary optical radiation having a low power as compared with the operational power of the laser beam;

(b) displacing the welding tool (52) from an operational position in the region of the welding location to the controlling position;

(c) supplying the optical channel of the welding tool (52) with the auxiliary optical radiation power;

(d) measuring with the measuring means the luminous intensity emitted by the welding tool (52), in its controlling position, supplied with the auxiliary optical radiation;

(e) comparing this intensity with an intensity threshold corresponding to the satisfactory operation of the welding tool (52); and (f) displacing the welding tool (52) towards a new operational welding position.

2. Process according to claim 1, wherein the auxiliary optical radiation is emitted by a helium-neon laser used to make the invisible laser beam visible, when the laser beam is operational.

3. Process according to claim 1, wherein the auxiliary optical radiation is emitted by the welding laser, adjusted to a power lower than the operational power.

4. Process according to claim 1, wherein the auxiliary optical radiation is emitted by a light-emitting diode at a wavelength adapted to its transmission in the optical channel of the welding tool (52).

5. Process according to claim 1, wherein the radiation emitted by the light-emitting diode has a wavelength equal to the wavelength of the welding laser.

6. Process according to claim 5, wherein the laser and the light-emitting diode emit at an identical wavelength of 1.06 microns.

7. Process according to any one of the preceding claims, said process being applied to the control of an optical channel carried by a welding iron (52) utilized for sleeve coupling a bundle of tubes of a steam generator (10) of a pressurized water nuclear reactor, the welding iron (52) having a welding head (58) which is inserted into the tubes (16, 17, 18) via ends of said tubes opening into a water reservoir (22) of said steam generator, so as to reach an operational position of said welding head, and which is extracted from the tubes (16, 17, 18) to be displaced in the water reservoir, said process comprising the step of measuring the luminous intensity emitted by the welding iron (52) supplied with the auxiliary optical radiation during the displacement, in the water reservoir, of the welding head (58) between a position of the head aligned with a first tube (16, 17, 18) which has just been sleeve-coupled and a position of the head aligned with a second tube (16, 17, 18) which is to be sleeve-coupled.

8. Control device for controlling the operation of an optical channel carried by a welding tool and conducting a welding laser beam, at an operational power, from a laser source (26) to a welding location wherein the measuring means (64) comprises a photoelectric cell (86) and an optical assembly (88) which is disposed in relation to the welding tool in such a manner as to focus onto said photoelectric cell the auxiliary radiation emitted by the welding tool (52) in the out of service position.

9. Device according to claim 8, which device is applied to the control of an optical channel carried by a welding iron (52) used for sleeve coupling tubes of a steam generator (10) of a pressurized water nuclear reactor, the welding iron (52) being carried by a frame (40) which is fixed on a carrier (36), which is disposed within a water reservoir (22) of the steam generator, and which comprises mean (34, 60) for displacing the welding iron between its operational position and the controlling position, the means for measuring the luminous intensity (64) being disposed on the frame (40) in such a manner as to receive the auxiliary optical radiation emitted by the welding iron (52), in the controlling position of the welding iron.

* * * * *